United States Patent [19]

Rosenberg

[11] 4,295,814
[45] Oct. 20, 1981

[54] METHOD AND APPARATUS FOR PRODUCING AND ASSEMBLING ARTICLES OF MOLDED PLASTIC PARTS

[76] Inventor: Peretz Rosenberg, Moshav Beit Shearim, Israel

[21] Appl. No.: 52,504

[22] Filed: Jun. 27, 1979

[30] Foreign Application Priority Data

Feb. 28, 1979 [IL] Israel ................................ 56761

[51] Int. Cl.³ .............................................. B29C 24/00
[52] U.S. Cl. ..................................... 425/517; 425/317
[58] Field of Search ................ 29/429, 430, 453, 467, 29/468; 264/238, 242; 425/317, 517

[56] References Cited

U.S. PATENT DOCUMENTS 3,477,095  11/1969  Lensky ............................. 29/453 X
3,958,760   5/1976  Rosenberg ......................... 239/453

Primary Examiner—Thomas P. Pavelko
Attorney, Agent, or Firm—Benjamin J. Barish

[57] ABSTRACT

A method and apparatus are described for producing an article constituted of two or more plastic parts, wherein a pair of mold plates are each provided with at least two spaced forming surfaces defining, in a closed position of the plates during a molding stroke, separate cavities each of the shape of one of the parts of the article. The mold plates are closed during the molding stroke to form the parts, after which the mold plates are opened and the apparatus is operated according to one or more assembling strokes. During each assembling stroke, one plate is stepped with respect to the other to bring the two parts into alignment, and the two mold plates are then closed to apply one part to the other.

The method and apparatus are described with respect to making a three-part spray nozzle.

6 Claims, 5 Drawing Figures

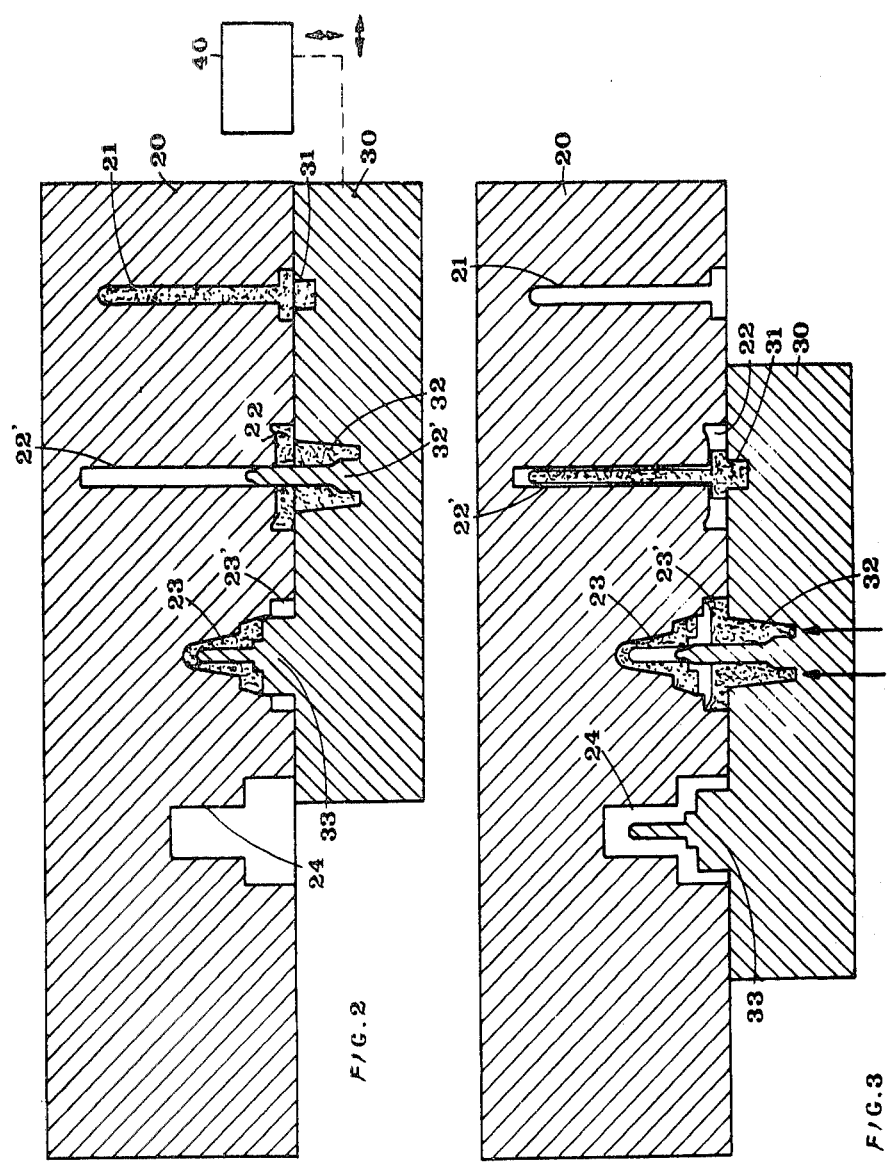

METHOD AND APPARATUS FOR PRODUCING AND ASSEMBLING ARTICLES OF MOLDED PLASTIC PARTS

BACKGROUND OF THE INVENTION

The present invention relates to a method and apparatus for producing and assembling articles made of molded plastic parts. The invention is particularly useful for producing and assembling a three-part spray nozzle, such as the one described in U.S. Pat. No. 3,958,760, and is therefore described below with respect to such application; but it will be appreciated that such an article is described purely for purposes of example and that the invention could be used for producing and assembling other articles having a smaller or greater number of parts.

The conventional procedure for producing articles made of a number of plastic parts is to form the individual parts (e.g. by injection molding) and then to assemble the parts together. This involves many handling operations since the parts are individually handled and then assembled together. Such a procedure is tedious, expensive and time-consuming particularly when the parts are very small. Moreover, this conventional procedure requires very close manufacturing tolerances which can greatly add to the manufacturing costs, since the parts of any one mold or batch must be freely interchangeable with the parts of other molds or batches to enable proper assembling of the complete article.

An object of the present invention is to provide a method and apparatus for producing articles constituted of a plurality of plastic parts, which method and apparatus have advantages in the above respects.

SUMMARY OF THE INVENTION

According to one broad aspect of the present invention, there is provided a method of producing an article constituted of at least two plastic parts, characterized in that; a pair of mold plates are provided one overlying the other, with each having at least two spaced forming surfaces defining, in a closed position of the plates during a molding stroke, separate cavities each of the shape of one of the parts of the article; the mold plates are closed during the molding stroke and their cavities are filled with plastic material to form the parts; the mold plates are then opened with one formed part retained by one plate and the other formed part retained by the other plate; one plate is then stepped with respect to the other to bring the two parts into alignment; the two plates are then closed during an assembling stroke to apply one part to the other; and the plates are then opened and the assembled article is ejected.

According to another broad aspect of the invention, there is provided apparatus for producing articles constituted of at least two plastic parts, characterized in that the apparatus includes: a pair of mold plates; means for effecting relative movement of the mold plates towards and away from each other to close and open them; each of the plates including at least two forming surfaces defining, in one closed position of the plates during a molding stroke of the apparatus, at least two cavities having shapes corresponding to the parts of the article, with one plate adapted to retain one of the molded parts and the other plate adapted to retain the other part when the plates are open, the two forming surfaces of each plate being laterally spaced from each other; and means for moving said other plate with the part retained thereby laterally with respect to the one plate, to align the two parts together in the open position of the two plates, such that in a subsequent closing of the plates during an assembling stroke of the apparatus, the part retained by the other plate is applied to the one plate in alignment with the part retained thereby.

According to another feature in the preferred embodiment of the invention described below, the article is constituted of at least three plastic parts assembled together, the apparatus being driven through a molding stroke and then through at least two assembling strokes, each of said plates including at least three forming surfaces laterally spaced from each other, such that:

(a) three separate cavities for the three parts are defined by the two plates in the closed molding stroke position of the plates, with one plate retaining a first part and the other plate retaining the second and third parts when the plates are opened following the molding stroke;

(b) the first part retained by the one plate is aligned with the second part retained by the other plate when the plates have been stepped to the open position of the first assembling stroke, at which time the plates are closed and the second part is applied to and is retained by the one plate in alignment with the first part, while the third part is retained by the other plate; and (c) the third part retained by the other plate is aligned with the first and second parts retained by the one plate when the plates have been stepped to the open position of the second assembling stroke, at which time the plates are closed and the third part is applied to the first and second parts to produce the assembled article.

It will thus be seen that the method and apparatus briefly described above provides a number of important advantages. One important advantage is that the apparatus automatically produces the completely assembled article, and thereby saves the time, effort and expense in separately handling the individual parts and assembling them together. In addition, since each article is assembled with the parts produced by an individual series of adjacent forming surfaces of the mold plates, it is only necessary that each such series of forming surfaces be matched so that the parts formed thereby will properly fit. This reduces very substantially the close manufacturing tolerances, and thereby the expense, that would normally be required when the parts are to be freely interchangeable with each other as in the concentional procedure.

Further features and advantages of the invention will be apparent from the description below.

BRIEF DESCRIPTION OF THE DRAWINGS

The invention is herein described, by way of example only, with reference to the accompanying drawings, wherein:

FIG. 1 illustrates one form of article, namely a three-part spray nozzle, that may be constructed in accordance with the method and apparatus of the present invention;

FIG. 2 illustrates one form of apparatus for use in making the article of FIG. 1, the mold plates in the apparatus of FIG. 2 being shown in their closed position during the molding stroke of the apparatus;

FIG. 3 illustrates the mold plates of FIG. 2 during the first assembling stroke of the apparatus;

DESCRIPTION OF THE PREFERRED EMBODIMENT

Figure 4:
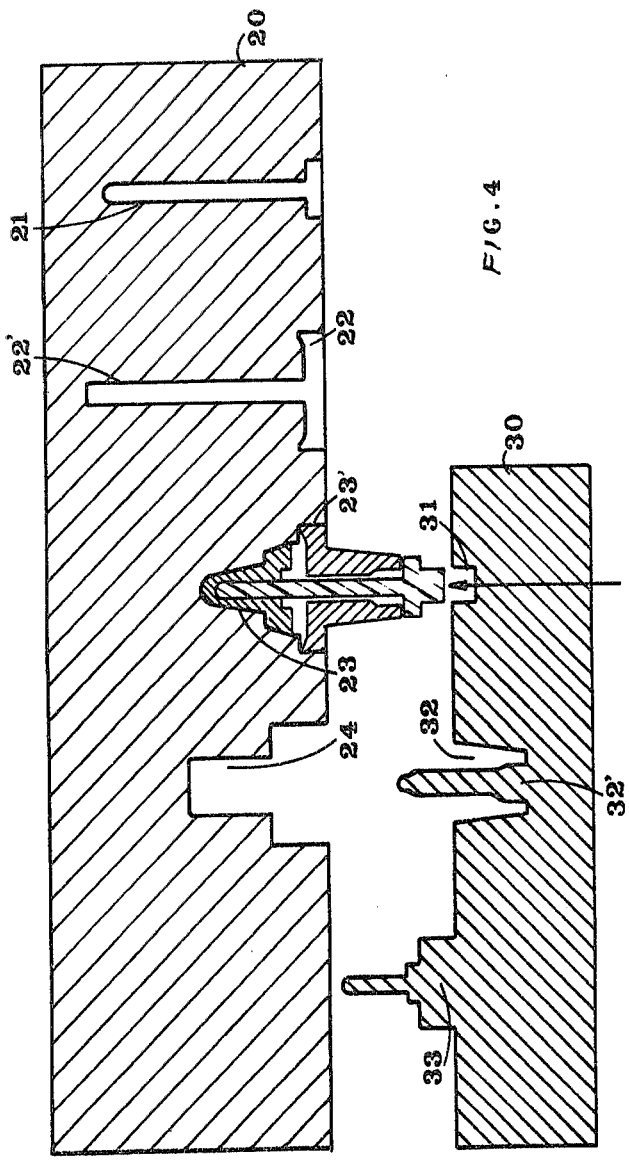
FIG. 4 illustrates the mold plates of FIG. 2 during the second assembling stroke of the apparatus.

The spray nozzle illustrated in FIG. 1 is of the three-part type described in my U.S.A. Patent 3,958,760. Briefly, it comprises a nozzle head, generally designated 2, having an enlarged upper end 4 and a narrower lower end 6 which is tapered to enable it to be frictionally-received within the apertured wall of a supply pipe (not shown). The nozzle head 2 is formed with an axial bore 8 terminating in an outlet orifice 10 through which the water issues in the form of a jet. A deflector cap 12 is floatingly supported by a pin 14 passing through bore 8 of the nozzle, pin 14 having a tapered upper end press-fitted into the deflector cap 12. The lower end of pin 14 is formed with a cross-bar 18 which limits against the lower face of the nozzle head 2. Pin 14 thus provides a floating mounting for the deflector cap 12, permitting the deflector cap to move both in a lateral direction and in a vertical direction with respect to the nozzle orifice 10. The lower surface of the deflector cap 12 facing the orifice 10 is formed with a circular recess 19 which automatically self-centers the deflector cap during the operation of the spray nozzle.

Further details of the construction and operation of the spray nozzle illustrated in FIG. 1 are set forth in my U.S. Pat. No. 3,958,760.

The three parts of the illustrated nozzle, namely the nozzle head 2, the deflector cap 12, and the pin 14, are all made of injection-molded plastic. Today, these parts are individually molded in multi-cavity molds and are then assembled together to form the complete article. As indicated above, this procedure is very time-consuming, expensive, and tedious, because of the need to handle many small parts separately and then to assemble them together; and moreover, it requires very close manufacturing tolerances since the parts must be freely interchangeable when assembling them together to make a complete spray nozzle.

FIGS. 2-4 illustrate one form of apparatus which may be used for producing the spray nozzle of FIG. 1 in a faster, more efficient, and less-expensive procedure, and one which does not require such close manufacturing tolerances in molding the individual parts.

The illustrated apparatus comprises a first mold plate 20, a second mold plate 30, and a drive 40 for moving mold plate 30 towards and away from mold plate 20 to close and open the mold. Drive 40 also steps mold plate 30 laterally of mold plate 20 when effecting the various strokes involved in one complete cycle of the apparatus. In the described example, the apparatus is driven through a first molding stroke wherein all three parts are simultaneously molded, and then through two consecutive assembling strokes for assembling the three parts to produce the completed article.

More particularly, mold plate 20 is formed with four shaped recessed 21, 22, 23 and 24, laterally spaced from each other. The first three recesses, 21, 22, and 23 are each specially configured to define a forming surface, namely a portion of the molding cavity, for producing the three parts (head 2, cap 12, and pin 14) in the completed nozzle. The fourth recess 24 is not used in the molding stroke of the apparatus, but rather is used in the first assembling stroke for accommodating a projection in the second mold plate 30, as will be described more particularly below.

The second mold plate 30 similarly includes forming surfaces 31, 32 and 33 which are configured so as to cooperate with forming surfaces 21, 22, and 23 respectively, of mold plate 20 to define the cavities for the three parts 2, 12, and 14 of the article to be produced. Forming surface 31 is likewise a recess and cooperates with recess 21 of mold plate 20 to define the shape of the pin 14 including its cross-bar 18. Forming surface 32 includes a recess which cooperates with recess 22 in mold plate 20 to form the head 2 of the spray nozzle. The axial bore 8 through the nozzle head 2 is defined by a projection 32' centrally of recess 32 which projection is received within an extension 22' of recess 22 in mold plate 20. Forming surface 33 of mold plate 30 in the form of a projection which defines, with recess 23 in mold plate 20, the shape of the deflector cap 12 of the finished article.

Recess 23 in mold plate 20 further includes an annular space 23' which is adapted to enclose projection 33 in mold plate 30 when the two mold plates are closed. Space 23' is of a configuration to accommodate the upper end 4 of the nozzle head 2 when the two are applied together for gripping and retaining the nozzle head during an assembling stroke of the apparatus as will be described more particularly below. Mold plate 30 does not include a forming surface corresponding to the end recess 24 in mold plate 20, since the latter recess is used merely to accommodate the projection 33 of mold plate 30 during an assambling stroke, as will also be described more particularly below.

As indicated earlier, each cycle of operation of the apparatus includes a molding stroke during which the mold plates are brought to the closed position illustrated in FIG. 2; a first assembling stroke during which, after plate 30 has been stepped laterally with respect to plate 20, the mold plates are brought to the closed position illustrated in FIG. 3; and a second assembling stroke during which, after plate 30 has again been stepped laterally with respect to plate 20, the mold plates are again brought to the closed (but not contacting) position illustrated in FIG. 4.

Figure 5:
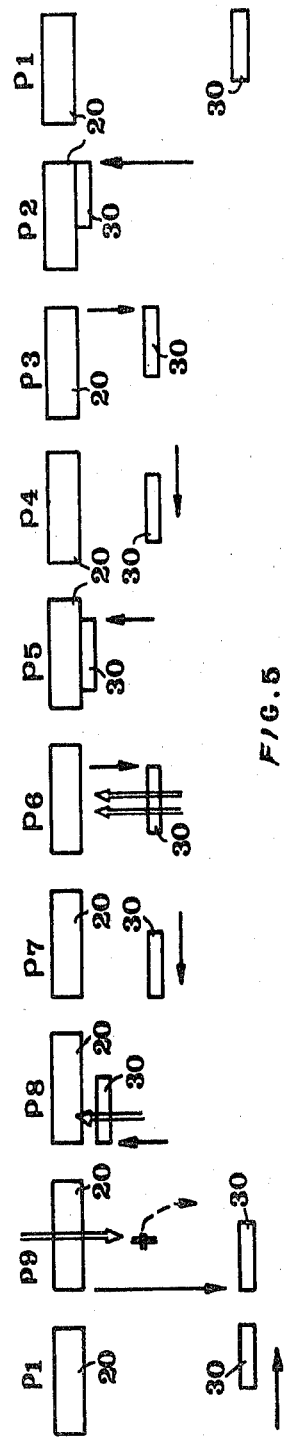
FIG. 5 diagrammatically illustrates the overall operation of the apparatus of FIGS. 2-4 for making the spray nozzle of FIG. 1.

One cycle of operation of the apparatus will now be described particularly with reference to FIG. 5, wherein the two mold plates 20 and 30 are first shown, at the right hand side, in their starting open position ($P_1$) before the first molding stroke.

To effect the first molding stroke, the drive 40 (FIG. 2) moves mold plate 30 to the closed position ($P_2$) with respect to mold plate 20. This is the position illustrated in FIG. 2, wherein it will be seen that the forming surfaces 21, 22, and 23 of mold plate 20 define with the forming surfaces 31, 32 and 33 of mold plate 30, three separate cavities corresponding to the shape of the three parts, namely the spray head 2, the cap 12, and the pin 14, of the spray nozzle illustrated in FIG. 1. More particularly, recesses 21 and 31 define the cavity for pin 14; recesses 22 and 32 define the cavity for the nozzle head, projection 32' defining the axial bore 8 of the head; and recess 23 and projection 33 define the cavity for the deflector cap 12.

When the two mold plates 20 and 30 are in their closed position ($P_2$) during the molding stroke, plastic material is injected into the above cavities to form the three parts 14, 2, and 12 respectively.

Mold plate 30 is then moved away from plate 20 ($P_3$), the formed cap 12 being retained by mold plate 20, and the formed head 2 and pin 14 being retained by the mold plate 30. Mold plate 30 is then stepped one increment laterally (leftwardly) of mold plate 20 (P₄) to align head 2 with cap 12, and is then moved towards mold plate 20 (P₅) to apply the head to the cap. This is the position illustrated in FIG. 3, and constitutes the first assembling stroke of the apparatus.

During this assembling stroke (FIG. 3), recess 24 in plate 20 accommodates projection 33 in plate 30, and recess extension 22' accommodates the formed pin 14. In addition the enlarged upper portion 4 of head 2 is received within annular space 23' of recess 23 in mold plate 20, so that the head 2 is retained by the mold plate 20 when mold plate 30 is moved away from plate 20 (P₆) to again open the mold.

Mold plate 30 is then stepped another increment laterally (leftwardly) of mold plate 20, as the head 2 is ejected from mold plate 30 so that the head is now retained in mold plate 20, together and in alignment with cap 12, while the pin 14 is still retained by mold plate 30.

Mold plate 30 is then incremented another step laterally (leftwardly) of mold plate 20 (P₇) to align pin 14 with the axial bore 8 in head 2. Plate 30 is then moved towards mold plate 20 (P₈) to pass pin 14 through bore 8, with the tapered end of the pin press-fitted into cap 12 and frictionally retained therein. This constitutes the second assembling stroke and is illustrated in FIG. 4, where it will be seen that plate 30 does not contact plate 20, but rather is spaced therefrom to accommodate the assembled article between them. Accordingly, projections 32' and 33 of plate 30 need not be accommodated by recesses in plate 20.

Mold plate 30 is then moved away from mold plate 20 (P₉) to permit the assembly of head 2, cap 12 and pin 14, to be ejected from mold plate 20, whereupon mold plate 30 is returned to its starting position (P₁) preparatory for a new cycle of operation of the apparatus.

While mold plates 20 and 30 illustrate only the cavities for producing one set of three parts which are assembled together to make one spray head during each cycle of operation of the apparatus, it will be appreciated that in practice the mold plates would normally be formed with a plurality of sets of cavities so as to produce a plurality of the completed articles during each cycle of operation of the apparatus.

Also, while the invention has been described for producing a three-part article, namely the spray nozzle illustrated in FIG. 1, it will be appreciated that it can be used in many other applications for producing many other types of articles having various numbers of parts.

What is claimed is:

1. Apparatus for producing articles constituted of at least two plastic parts, characterized in that the apparatus includes: a pair of mold plates one overlying the other; means for effecting relative movement between said pair of mold plates towards and away from each other to close and open them; each of said pair of mold plates including at least two forming surfaces defining, in one closed position of the plates during a molding stroke of the apparatus, at least two cavities having shapes corresponding to the parts of the article, with one plate of said pair adapted to retain one of the molded parts and the other plate of said pair adapted to retain the other part when the pair of plates are open, the two forming surfaces of each plate of said pair being laterally spaced from each other; and means for effecting relative movement between said pair of plates in the lateral direction to align the two parts retained thereby in the open position of the pair of plates, such that in a subsequent closing of the pair of plates during an assembling stroke of the apparatus, the part retained by one plate of said pair is applied to the part retained by the other plate of said pair.

2. Apparatus according to claim 1, wherein said one plate includes a recess for retaining the part applied thereto from said other plate during said assembling stroke.

3. Apparatus according to claim 1, wherein said article is constituted of at least three plastic parts assembled together, the apparatus being driven through a molding stroke and then through at least two assembling strokes, each of said plates including at least three forming surfaces laterally spaced from each other, such that:

(a) three separate cavities for the three parts are defined by the two plates in the closed molding stroke position of the plates, with one plate retaining a first part and the other plate retaining the second and third parts when the plates are opened following the molding stroke;

(b) the first part retained by the one plate is aligned with the second part retained by the other plate when the plates have been stepped to the open position of the first assembling stroke, at which time the plates are closed and the second part is applied to and is retained by the one plate in alignment with the first part, while the third part is retained by the other plate; and (c) the third part retained by the other plate is aligned with the first and second parts retained by the one plate when the plates have been stepped to the open position of the second assembling stroke, at which time the plates are closed and the third part is applied to the first and second parts to produce the assembled article.

4. Apparatus according to claim 3, wherein said forming surfaces of the two plates are configured, to produce a first part in the form of a cap of a spray nozzle, a second part in the form of a head of a spray nozzle, and a third part in the form of a pin of a spray nozzle, which pin, during the second assembling stroke, is frictionally fitted at one end into the cap and includes a stop at the opposite end engageable with the nozzle head.

5. Apparatus according to claim 3, wherein the forming surfaces of said one mold plate include a recess for each of the three parts, the second recess including a section for retaining the part applied thereto during the first assembling stroke of the apparatus.

6. Apparatus according to claim 5, wherein said one mold plate includes an additional end recess for accommodating a projection of the other mold plate during the first assembling stroke of the apparatus.

* * * * *